United States Patent [19]

Hovens

[11] Patent Number: 4,527,196
[45] Date of Patent: Jul. 2, 1985

[54] TELEVISION RECEIVER COMPRISING A VIDEO SIGNAL DETECTOR OF A TYPE WHICH DETECTS WITH THE AID OF A REFERENCE SIGNAL

[75] Inventor: Paulus J. M. Hovens, Eindhoven, Netherlands

[73] Assignee: U.S. Philips Corporation, New York, N.Y.

[21] Appl. No.: 458,120

[22] Filed: Jan. 14, 1983

[30] Foreign Application Priority Data

Feb. 2, 1982 [NL] Netherlands ............... 8200374

[51] Int. Cl.³ .................................... H04N 9/50
[52] U.S. Cl. ........................... 358/158; 358/23; 358/188
[58] Field of Search ............. 358/23, 25, 158, 188, 358/195.1, 174

[56] References Cited

U.S. PATENT DOCUMENTS

| | | | |
|---|---|---|---|
| 4,157,569 | 6/1979 | Apeldoorn | 358/188 |
| 4,159,482 | 6/1979 | Apeldoorn | 358/23 |
| 4,319,276 | 3/1982 | Cense | 358/158 |

Primary Examiner—Tommy P. Chin
Attorney, Agent, or Firm—Thomas A. Briody; William J. Streeter; Edward W. Goodman

[57] ABSTRACT

In a television receiver comprising an automatic gain control circuit which receives an output signal from a synchronous detector and from an asynchronous detector, the asynchronous detector is decoupled from the automatic gain control circuit in the normal receiving mode by a switching signal obtained from a receiving mode detector.

6 Claims, 2 Drawing Figures

FIG.I

TELEVISION RECEIVER COMPRISING A VIDEO SIGNAL DETECTOR OF A TYPE WHICH DETECTS WITH THE AID OF A REFERENCE SIGNAL

BACKGROUND OF THE INVENTION

The invention relates to a television receiver comprising, coupled to an output of an intermediate frequency signal path, a video signal detector of a type which detects with the aid of a reference signal and, coupled to an output of the intermediate frequency signal path, an asynchronous detector, an automatic gain control circuit being coupled to an output of these detectors and the asynchronous detector being made inoperative in the normal receiving mode.

U.S. Pat. No. 4,209,805 discloses a television receiver of the above mentioned type. Making the asynchronous detector inoperative in the normal receiving mode, when the video signal detector, which detects with the aid of the reference signal, provides the automatic gain control, is effected by keeping the normal amplitude of the intermediate frequency signal at the asynchronous detector sufficiently far below the threshold value of that asynchronous detector. The normal amplitude-threshold value ratio is then disadvantageous. A more advantageous ratio is not possible without entailing an unwanted operation of the asynchronous detector in the normal operating mode.

SUMMARY OF THE INVENTION

The invention has for its object to obviate this drawback.

According to the invention, a television receiver of the type described in the opening paragraph is characterized in that the asynchronous detector can be switched-off by means of a switch-off signal obtained from a receiving mode detector and occurring in a normal receiving mode, so that in the normal receiving mode, the automatic gain control circuit cannot be driven by the asynchronous detector.

By the measure in accordance with the invention, the threshold value of the asynchronous detector can be chosen to be very near the value corresponding to the normal amplitude of the intermediate frequency signal in the normal receiving mode.

DESCRIPTION OF THE DRAWINGS

The invention will now be further described by way of example with reference to the accompanying drawings, in which.

DESCRIPTION OF THE PREFERRED EMBODIMENT

Figure 1:
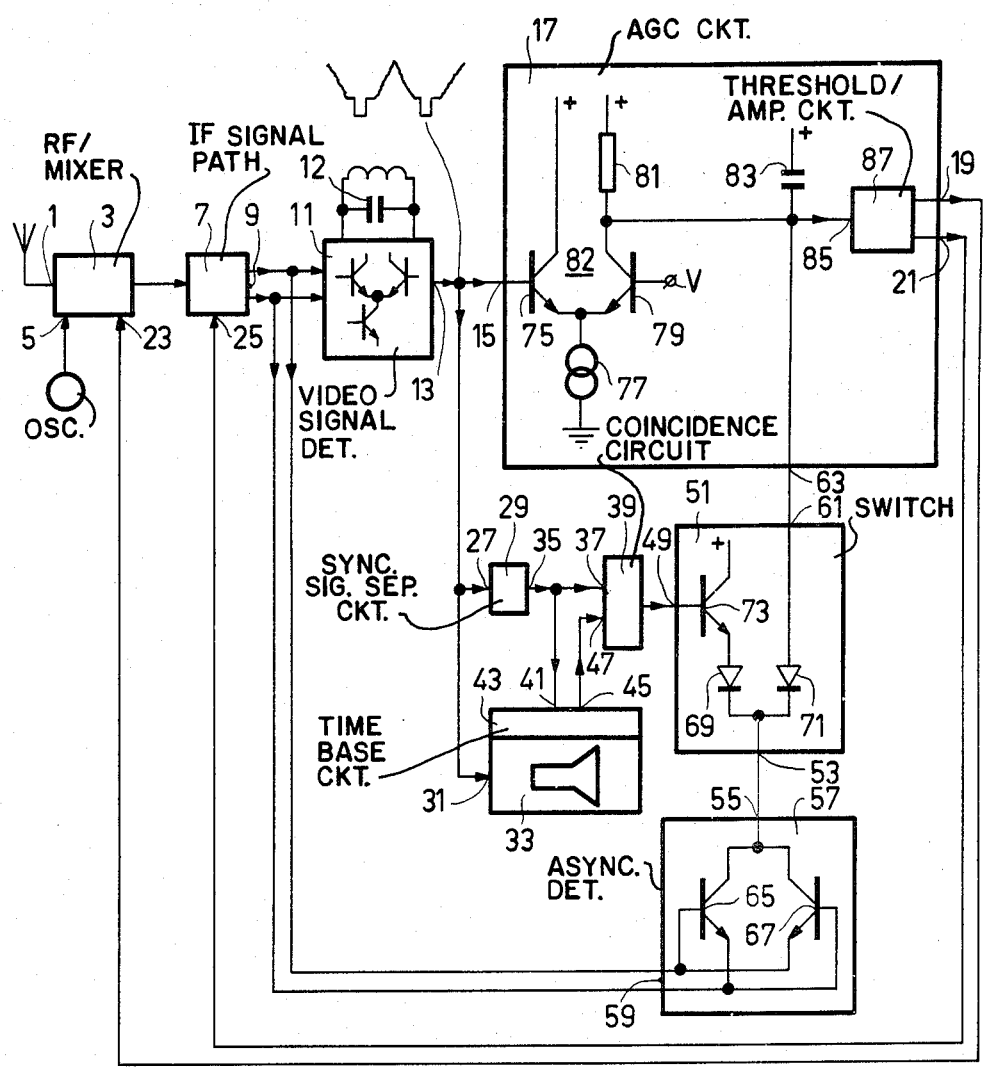
FIG. 1 shows a first embodiment of a circuit diagram of a television receiver in accordance with the invention.

In FIG. 1, a received television signal is applied to an input 1 of a radio-frequency and mixer portion 3. This signal is converted, with the aid of an oscillator signal applied to an input 5, into an intermediate-frequency signal which is applied to an intermediate-frequency signal path 7.

From a balanced output 9 of the intermediate frequency signal path 7, the intermediate frequency signal is applied to a video signal detector 11, which is of a type which detects with the aid of a reference signal. As is known, this reference signal can be derived in several manners from the intermediate frequency signal. For the sake of clarity this is shown in FIG. 1 only by means of a resonance circuit 12 and is not shown in detail.

From an output 13 of the video signal detector 11, a demodulated video signal is obtained which is applied to an input 15 of an automatic gain control circuit 17. Control signals, which are applied to control signal inputs 23 and 25 of the radio-frequency and mixer portion 3 and the intermediate-frequency signal path 7, respectively, are obtained from two outputs 19, 21 of the automatic gain control circuit 17.

The video signal at the output 13 of the video signal detector 11 is further applied to an input 27 of a synchronizing signal separating circuit 29 and to an input 31 of a picture display device 33. An output 35 of the synchronizing signal separating circuit 29 applies a synchronizing signal to an input 37 of a coincidence circuit 39, which serves as a receiving mode detector, and to a synchronizing signal input 41 of a time-base circuit 43 of the picture display device 33. An output 45 of the time-base circuit 43 applies fly-back signals to an input 47 of the coincidence circuit 39, which applies a switching signal to an input 49 of a switch 51 upon the simultaneous occurrence of synchronizing signals and fly-back signals.

An input 53 of the switch 51 is connected to an output 55 of an asynchronous detector 57, a balanced input 59 of which is connected to the balanced output 9 of the intermediate frequency signal path 7.

An output 61 of the switch 51 is connected to an input 63 of the automatic gain control circuit 17. In the asynchronous detector 57, the base-emitter junctions of two transistors 65, 67 are connected in anti-parallel to the input 59. The collectors of these transistors are connected to the output 55.

In the switch 51, the input 53 is connected to the cathodes of two diodes 69, 71. The anode of the diode 71 is connected to the output 61 of the switch 51 and the anode of the diode 69 is connected to the emitter of a transistor 73, the base thereof being connected to the input 49 of the switch 51 and the collector to a positive voltage. If the voltage at the base of the transistor 73 is high, then the diode 69 conducts if one of the transistors 65, 67 of the asynchronous detector 57 is conductive and the diode 71 remains in the non-conducting state. The voltage at the base of the transistor 73 is high when the coincidence circuit 39 detects a coincidence between the signals at its inputs 37 and 47. The television receiver is then in its normal operating mode and the asynchronous detector 57 is switched-off as the connection between the input 53 and the output 61 of the switch 51 is broken by the diode 71 being in the non-conducting state. If the voltage at the base of the transistor 73 is low, then the receiver is in its abnormal operating mode and the diode 69 becomes nonconductive, and, if the transistors 65 and 67 of the asynchronous detector 57 are conducting, the diode 71 also conducts and consequently the output 55 of the asynchronous detector 57 is connected to the input 63 of the automatic gain control circuit 17.

The transistors 65 and 67 of the asynchronous detector 57 conduct if their base-emitter voltages are sufficiently high, such as when the amplitude of the intermediate frequency signal at the balanced output 9 of the intermediate frequency signal path 7 exceeds a threshold value which is determined by the properties of the transistors 65,67.

In the automatic gain control circuit 17, the base of a transistor 75, whose emitter is connected to a current source 77 and to the emitter of a transistor 79, is connected to the input 15. The collector of the transistor 75 is connected to a positive voltage, the collector of the transistor 79 is connected to that positive voltage via a resistor 81 and the base of the transistor 79 is connected to a reference voltage V. The transistors 75 and 79 form a selection circuit 82 with which a level of the video signal applied to the input 15 is selected at which, in the normal operating mode, the automatic volume control of the television receiver is operative. This level determines, in said normal operating mode, the value of the direct voltage at a capacitor 83 which is connected to the collector of the transistor 79 and also to the input 63. As the connection between the input 63 and the output 55 of the asynchronous detector 57 is then broken, the asynchronous detector 57 can not influence the direct voltage at the capacitor 83. This direct voltage is applied to an input 85 of a threshold and amplifier circuit 87, whose outputs are connected to the outputs 19 and 21. Variations in the direct voltage at the capacitor 83 are counteracted by the resultant change of the gain of the radio-frequency and mixing portion 3 and/or the intermediate frequency signal path 7.

As was explained above, in the abnormal operating mode of the receiver, if, for example, no synchronizing signals occur at the input 37 of the coincidence circuit 39, the asynchronous detector 57 is connected to the capacitor 83 via the switch 51. The direct voltage at the capacitor can then be determined by the asynchronous detector 57. The absence of synchronizing signals at the input 37 of the coincidence circuit 39 can, as is known, be in certain cases the result of an overdrive of the video signal detector 11. So in those cases blocking of the automatic volume control is prevented from occurring by the operation of the asynchronous detector 57.

The automatic gain control circuit 17 may be proportioned so that the direct voltage at the capacitor 83 is almost equal in the abnormal operating mode to the direct voltage in the normal operating mode, so that the threshold value of the asynchronous detector 57 need differ only a little from the amplitude value of the intermediate-frequency signal at the input 59 thereof in the normal operating mode.

In the embodiment described, the switch 51 is arranged in series with the asynchronous detector 57. Although this results in a very simple circuit, it is of course alternatively possible to switch the switch which is operable by the switching signal in a different manner.

Figure 2:
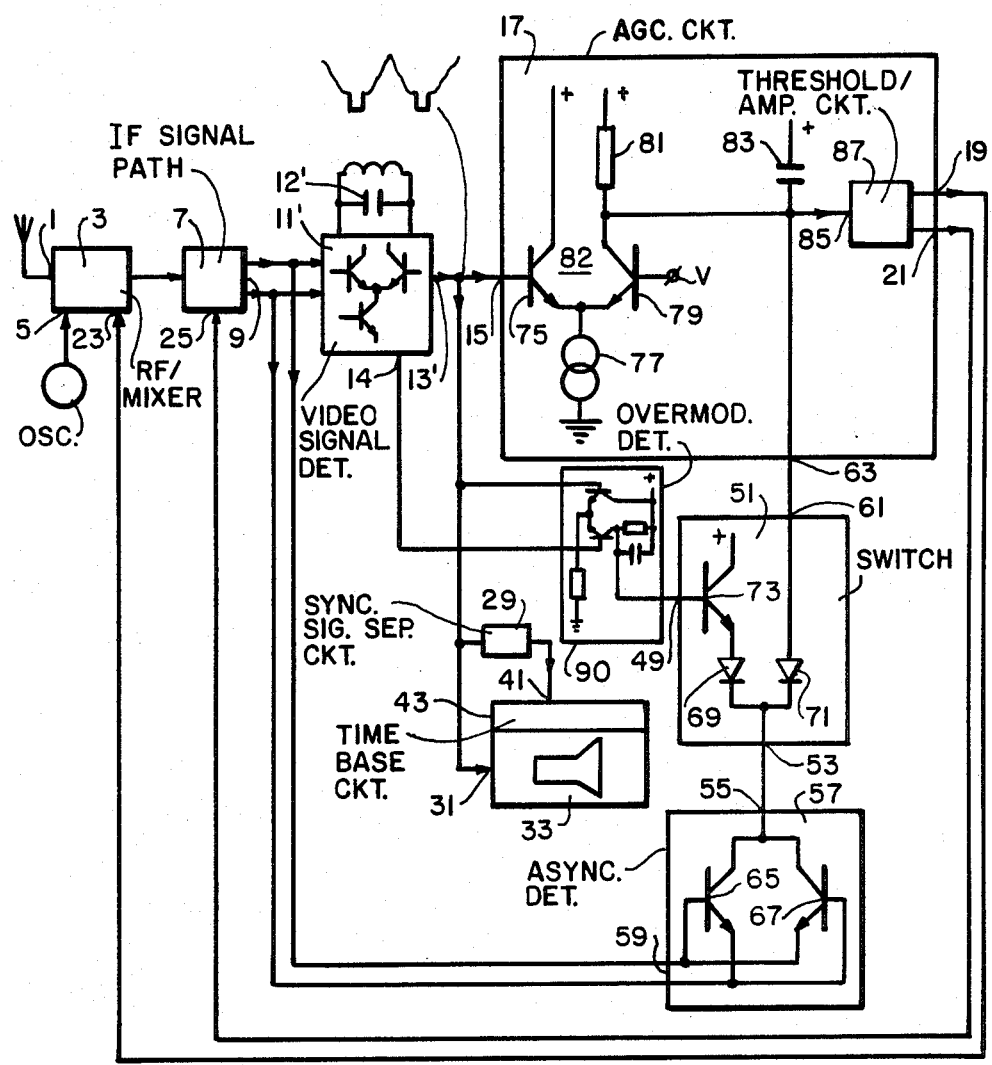
FIG. 2 shows a second embodiment of the television receiver.

If so desired, another suitable circuit may be used as the receiving mode detector instead of the coincidence circuit 39. As shown in FIG. 2, an overmodulation or whiter-than-white detector 90 has been found to be suitable for use as a receiving mode detector. The detector 90 includes an input for receiving the output from a video signal detector 11'. Video signal detector 11' is substantially similar to video signal detector 11 with the exception that detector 11' includes an output for a reference signal generated therein by a circuit 12', as described above in the description of detector 11. This reference signal is applied to a second input of detector 90, the output of which is applied to input 49 of switch 51. The detector 90 is described in U.S. Pat. No. 4,159,482 at column 2, lines 13–26 and includes circuit elements 33, 35, 36, 39 and 41 as shown in FIG. 1 therein.

It will be obvious that an amplifier or buffer stage may additionally be incorporated between the output 9 of the intermediate-frequency signal path 7 and the input 39 of the asynchronous detector 57 and/or the video signal detector 11.

The current source 77 of the selection circuit 82 can operate in the keyed or the non-keyed mode, or may be switchable from keyed to non-keyed, for example as described in the German Offenlegungsschrift No. 1,963,465 (PHD 1436).

The video signal detector 11 detecting with the aid of a reference signal may be of a synchronous or a quasi-synchronous type, in the latter case the reference signal can, as is known, be derived from the input signal in a simpler manner than in the first-mentioned case.

What is claimed is:

1. A television receiver comprising, coupled to an output of an intermediate frequency signal path, a video signal detector of a type which detects with the aid of a reference signal and, coupled to an output of the intermediate frequency signal path, an asynchronous detector, an automatic gain control circuit being coupled to an output of these detectors and the asynchronous detector being made inoperative in a normal receiving mode, characterized in that said television receiver further comprises means for decoupling the asynchronous detector from said automatic gain control circuit, said decoupling means having a control input, and a receiving mode detector coupled to said video signal detector for detecting said normal receiving mode, said receiving mode detector generating a switching signal which is applied to the control input of said decoupling means.

2. A television receiver as claimed in claim 1, characterized in that said decoupling means comprises a controllable switch incorporated between the output of the asynchronous detector and the automatic gain control circuit, said controllable switch receiving said switching signal as said control input.

3. A television receiver as claimed in claim 1, characterized in that said television receiver further comprises means coupled to the video signal detector for separating a synchronizing signal, and said receiving mode detector comprises a coincidence circuit for receiving said synchronizing signal and an oscillator signal which is synchronized by said synchronizing signal.

4. A television receiver as claimed in claim 1, characterized in that said receiving mode detector comprises an overmodulation detector.

5. A television receiver as claimed in claim 2, characterized in that said receiving mode detector comprises an overmodulation detector.

6. A television receiver as claimed in claim 2, characterized in that said television receiver further comprises means coupled to the video signal detector for separating a synchronizing signal, and said receiving mode detector comprises a coincidence circuit for receiving said synchronizing signal and an oscillator signal which is synchronized by said synchronizing signal.

* * * * *